United States Patent [19]

Martin, Jr.

[11] Patent Number: 4,618,919
[45] Date of Patent: Oct. 21, 1986

[54] TOPOLOGY FOR MINIATURE POWER SUPPLY WITH LOW VOLTAGE AND LOW RIPPLE REQUIREMENTS

[75] Inventor: Hubert C. Martin, Jr., Sandy, Utah

[73] Assignee: Sperry Corporation, New York, N.Y.

[21] Appl. No.: 657,668

[22] Filed: Oct. 4, 1984

[51] Int. Cl.⁴ .................................. H02M 3/335
[52] U.S. Cl. .................................. 363/21; 363/16
[58] Field of Search .............. 363/15, 16, 20, 21, 363/39, 40, 45, 124, 131, 133; 323/268, 271, 272

[56] References Cited

U.S. PATENT DOCUMENTS

| 4,415,959 | 11/1983 | Vinciarelli | 363/21 |
| 4,441,146 | 4/1984 | Vinciarelli | 363/56 |
| 4,500,949 | 2/1985 | Prete | 363/124 |

Primary Examiner—Peter S. Wong
Assistant Examiner—Judson H. Jones
Attorney, Agent, or Firm—Laurence J. Marhoefer; Glenn W. Bowen

[57] ABSTRACT

A power supply topology which minimizes inductance and capacitance requirements for filtering the ripple of single or multiple output switching mode power supplies. A capacitor at the input of the power supply provides continuous support for the output signal produced by the power supply.

13 Claims, 4 Drawing Figures

TOPOLOGY FOR MINIATURE POWER SUPPLY WITH LOW VOLTAGE AND LOW RIPPLE REQUIREMENTS

BACKGROUND

1. Field of the Invention.

This invention is directed to power supplies, in general, and to a miniaturized power supply which has low voltage and low ripple, in particular.

2. Prior Art.

There are many power supplies which are known in the prior art. However, there are not many power supplies known in the art which use the switching mode of operation and which can operate at high frequencies, for example, on the order of 1 MHz. Moreover, in the current technology the trend is to produce power supplies which have lower and lower output voltage while producing higher and higher currents. These operating requirements tend to make power supply design and production very difficult.

In known power supplies, those using the "fly back" technique generally require relatively few components. This is because the fly-back type power supplies, generally, tend to perform some of the filtering and/or storage capability within the transformer of the power supply.

In power supplies other than the fly back type, such as the forward converter (wherein the transformer is used for isolation) or the step-up or step-down type, another inductor element is usually required in the low pass filter element in order to filter the ripple on the output signal. Thus, this configuration requires a minimum of two inductors in every power supply.

Inasmuch as the inductive elements tend to comprise the vast majority of the structural volume and weight in the power supplies of known design, any additional inductors are usually undesirable components. Therefore, it is desirable to devise a power supply which can provide a lower output voltage (e.g. 5v) and a higher output current (e.g. up to 100A) while reducing the physical size requirements of the magnetic (inductive) components.

Also, in the known prior art, it is typical to include a capacitive output load in order to provide desirable filtering of the output signal. However, this output capacitance places certain requirements and restrictions on the circuit design. These ratings are especially critical in many military applications.

Moreover, in the known circuit topologies, it is desirable to use ceramic dielectric filter capacitors, especially in higher frequency applications. This construction is difficult to achieve in a relatively simple, inexpensive fashion which is also acceptable in this circuit configuration. That is, the high frequency, low voltage output signal requires a relatively large capacitor which is difficult (or cumbersome) to provide.

PRIOR ART STATEMENT

The most pertinent prior art known to applicant is listed herewith.

U.S. Pat. No. 4,415,959; FORWARD CONVERTER SWITCHING AT ZERO CURRENT; P. Vinciarelli. This patent is directed to a DC-to-DC converter which processes power by a sequence of energy transfer cycles. During each transfer cycle a quantum of energy is transferred from a voltage source to a current sink via a transformer. This transfer circuit defines a characteristic time scale such that a switch connected in series with the voltage source can be switched on and off at zero current.

It is noted that this transfer circuit incorporates an output circuit which includes, inter alia, an output capacitive load element which, allegedly, does not return any energy to the transformer.

U.S. Pat. No. 4,441,146; OPTIMAL RESETTING OF THE TRANSFORMER'S CORE IN SINGLE ENDED FORWARD CONVERTERS; P. Vinciarelli. This patent is directed to a single ended forward converter wherein the core of the transformer is reset by a magnetiziing current mirror which includes a capacitor in series with an auxiliary switch which selectively connects the capacitor to a transformer winding to form a resonant circuit thereby, effectively, recycling the magnetizing energy of the transformer.

Again, this circuit includes an output capacitive load element or multiple switches which selectively connect a source to a storage capacitor or to a transformer.

SUMMARY OF THE INVENTION

This invention is directed to an interleaved timing, power converter that functions as a power supply which produces a relatively low output voltage with a relatively high output current and uses inductive components with reduced size requirements. The power supply includes an input capacitor which performs the filtering function for the output signals. The capacitor also stores energy at high voltages as a result of the turns ratio of the power supply transformer.

A switching circuit is arranged so that the input capacitor is selectively connected across the transformer in the power supply whereby the voltage stored on the capacitor is always available to be used to provide support to the output signal.

Moreover, the power supply is arranged to operate to compensate for low or high input voltage conditions relative to the nominal input voltage condition which is originally specified.

DESCRIPTION OF A PREFERRED EMBODIMENT

As a brief introduction, it is noted that a conventional fly back circuit includes a transformer and a switch in series with the primary winding as well as a capacitive load. However, this circuit suffers from the generation of a spike and the consequent ringing voltage (due to inductive reaction) when the switch is opened.

This spike and ringing can be reduced by including an RC voltage clamp circuit across the primary winding of the conventional fly back circuit described above. However, this solution results in substantial power dissipation in the clamp circuit.

Even removing the resistance component and causing the switch to alternately connect the primary winding or the capacitor to the voltage source, does not remove the capacitive load requirement from the circuit configuration. Thus, these problems remain, as discussed above. As a result, a novel circuit topology is highly desirable.

Figure 1:
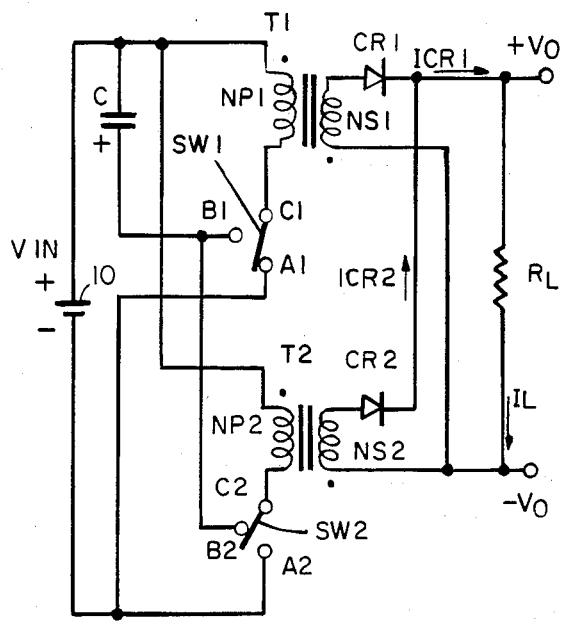
FIG. 1 is a schematic diagram of a preferred embodiment of the power supply of the instant invention.

Referring now to FIG. 1, there is shown a schematic diagram for a power supply in accordance with the instant invention. This circuitry is designed to provide the optimum topology for a relatively high frequency (e.g. 1 MHz) power supply circuit. In particular, the input signal Vin is supplied by means of a suitable source such as a battery 10. This source may supply any suitable voltage such as 28 volts, 160 volts, or the like. In the preferred embodiments, the source 10 provides a DC voltage and the instant invention operates as a DC/DC converter.

The anode or positive side of the battery 10 is connected to one terminal of capacitor C and, as well, to one terminal of each of the primary windings NP1 and NP2 of transformers T1 and T2, respectively. The other terminals of primary windings NP1 and NP2 are connected, at terminals C1 and C2, to the blade arms (or other similar common terminal) of switches SW1 and SW2, respectively.

The terminals A1 and A2 of switches SW1 and SW2, respectively, are connected together and to the negative or cathode terminal of battery 10. In addition, the terminals B1 and B2 of switches SW1 and SW2, respectively, are connected together and to the other terminal of capacitor C. Of course, switches SW1 and SW2 are not limited to relay-type switches but are shown as such for convenience.

One terminal of each of the secondary windings NS1 and NS2 of transformers T1 and T2, respectively, is connected to the anode of diodes CR1 and CR2, respectively. The cathodes of diodes CR1 and CR2 are connected together and to the output terminal +VO. The other terminals of secondary windings NS1 and NS2 are connected together and to the other output terminal −VO. A suitable load represented by resistor RL is connected between the output terminals +VO and −VO. The typical "dot convention" is utilized as shown.

Figure 2:
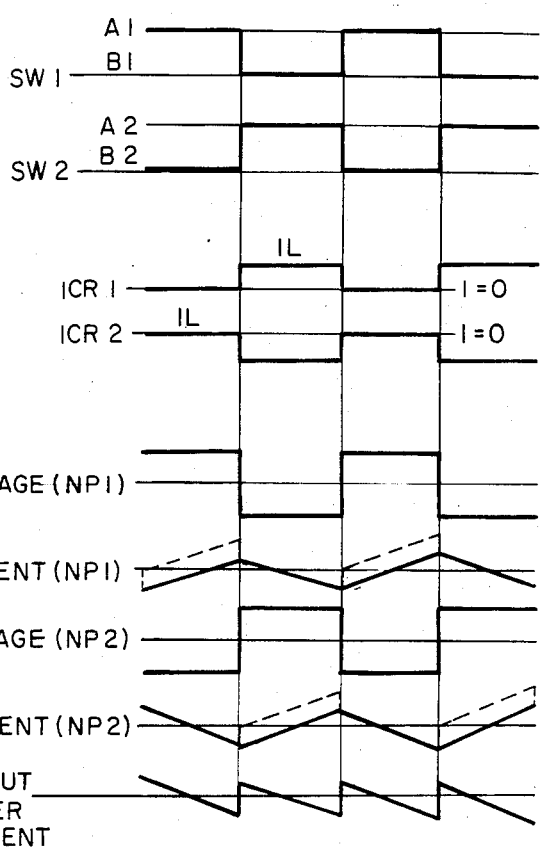
FIGS. 2 and 3 are timing diagrams showing the operation of the power supply in low and high voltage conditions, respectively.
Figure 3:
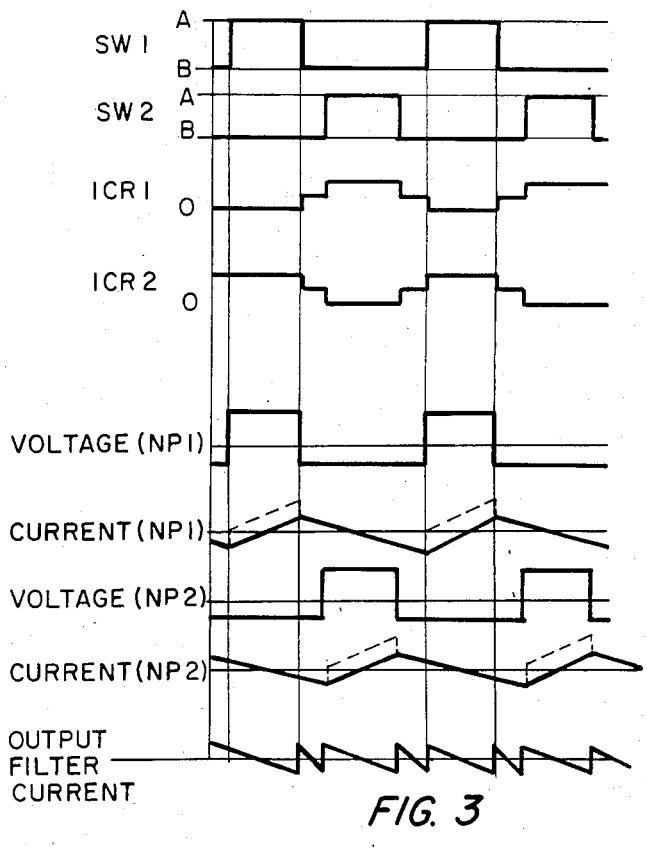

In describing the operation of the circuit, reference is also made to FIGS. 2 and 3. As noted, FIG. 2 represents the low voltage operation of the system while FIG. 3 represents the high voltage operation of the system. That is, battery 10 has a nominal input voltage of, for example, 28 volts. However, for various reasons such as battery decline, line attenuation or the like, the voltage at any time may be reduced. Conversely, the voltage may be increased because of dynamic changes in motor-generator power sources or the like. In this case, it is not unusual for the source to have a dynamic range between 33 volts (high voltage) or 22 volts (low voltage). Of course, these voltages are exemplary only and may vary from system to system.

Initially, it is assumed that the system has reached a settled operating condition with all spurious and similar signals or pulses removed, damped, or the like. In the initial condition, it will be assumed that switch SW1 is connected to the A1 terminal while switch SW2 is connected to the B2 terminal. In the low voltage operation, a 50% duty cycle is typical. Consequently, the switches will be in the opposite state or, effectively, 180% out of phase as shown at lines SW1 and SW2 of FIG. 2. As time progresses, the switches will be caused to reverse position so that the signals supplied through the switches to the remainder of the circuit will change as discussed hereinafter.

Nevertheless, with the switches SW1 and SW2 in the initial condition (as shown), the voltage developed across primary winding NP1 is opposite in sign from the voltage developed across primary winding NP2 as shown at lines T1 PRIMARY VOLTAGE and T2 PRIMARY VOLTAGE in FIG. 2. During this time, the current through the respective primary windings NP1 and NP2 is ramping up or down as is also shown in the FIG. 2 at the lines which show the T1 primary current and T2 primary current. Incidentally, the solid line in the current signals represents a "no load" condition while the dashed line represents a "full load" condition for the system. Thus, it is seen that capacitor C is continually charging and discharging through the respective switches and the associated primary windings thereby to provide energy support to the output circuit through the respective inductive windings of the transformers. This is shown by the application of load current IL through diodes CR1 or CR2, respectively. (See lines ICR1 and ICR2 in FIG. 2.)

More particularly, with switch SW1 connected to terminal A1 and switch SW2 connected to terminal B2, the input voltage Vin is impressed across primary winding NP1. Because of the winding relationship, diode CR1 is reverse biased. At this time, the current in coil NP1 is changing linearly with time and the load current, IL, through diode CR1 is zero. At the same time, a voltage is impressed across the primary winding NP2 of transformer T2. This voltage is supplied by capacitor C which was previously charged as a result of the continual charging (and discharging) of capacitor C as switch SW1 is moved from terminal A1 to terminal B1 and switch SW2 is moved from terminal A2 to terminal B2. This charging and discharging eventually produces a residual charge (and, thus, voltage) on capacitor C. More particularly, in a no load condition, when the coil NP1 (or NP2) is placed across the battery Vin for a given period of time, e.g. a 50% duty cycle, a current will rise in the coil. The energy which will be stored can be calculated based on the equation of $\frac{1}{2} LI^2$ which is defined in joules. When the source is switched from the coil to the capacitor C, the energy (joules) will move to the capacitor. The energy is calculated in accordance with the formula $CV^2/2$. That calculation assumes the circuit is not delivering anything to the load. Considering the 50% duty cycle, it is seen that some of the energy from the capacitor C will go back into the coil (and vice versa) due to the fact that the circuit is transferring energy back and forth.

Thus, when the capacitor C is connected in circuit, energy is taken out of the coil and put into the capacitor for a half cycle and then the energy goes back into the coil from the capacitor. That is, a tank circuit is, effectively, produced which moves energy back and forth. When a load is connected to the circuit, the DC component in the coil actually shifts. That is, the circuit is delivering some of the energy to the load when the switch is connected to the capacitor C. Thus, rather than putting energy back into the coil, energy is supplied into the load.

It is well known that placing a voltage across an inductor will cause the current therein to rise linearly. Likewise, upon placing a current into a capacitor, the voltage will change linearly. An inductor and a capacitor form a tank circuit which, essentially, transfers energy back and forth. This voltage condition tends to cause diode CR2 to be forward biased and to conduct load current IL therethrough.

When switch SW1 moves to terminal B1 and switch SW2 moves to terminal A2, the steady-state voltage previously stored on capacitor C is now impressed across coil NP1, but in the opposite direction relative to Vin. The voltage Vin is also impressed across coil NP2. Thus, the current in coil NP1 recovers to an initial level and the current in coil NP2 increases whereby the currents in coils NP1 and NP2 are very nearly a saw-tooth wave as shown in FIGS. 2 and 3.

Moreover, in this condition, diode CR1 is forward biased (while diode CR2 is reverse biased) whereupon the voltage across capacitor C is reflected across the transformer T1. Thus, capacitor C provides support to the output signal when either switch SW1 or SW2 is in position B1.

This same operation occurs relative to transformer T2 and capacitor C. Thus, the support of the output signal is again provided by capacitor C. This is guaranteed by the interleaved timing of the operation of the switches SW1 and SW2 so that at least one of the switches is always connected to the respective B terminal. Thus, there will never be a "dead-time" when the capacitor C is not providing support to the output voltage. It is seen that the load current shifts to the other transformer circuit whenever a switch is at the respective position A.

In the high voltage condition shown in FIG. 3, the circuit operates in much the same way. However, a different duty cycle is required and switches SW1 and SW2 will switch at different times. In the example shown, the duty cycle is approximately 33%, i.e. the high voltage is supplied through each switch in the circuit for approximately $\frac{1}{3}$ of the operating time. That is, the duty cycle or "on" condition of the switches is controlled to compensate for the input voltage level. As a result, each of the switches is "on" for a reduced time period. However, the voltage/time product remains constant. This tends to cause some overlaps in the interconnections of the circuit.

Thus, it is seen in FIG. 3 that the respective terminal C of each of switches SW1 and SW2 can be connected to the respective B terminals at the same time. This causes a sharing of the current in the capacitor storage circuit. As a consequence, it is seen that a stepped load current signal IL is effected through the respective diodes CR1 and CR2.

In addition, it is clearly seen that the voltages across the primary windings NP1 and NP2 follow the same duty cycle. Moreover, the amount of energy transferred (as calculated by amplitude×time) is the same in each cycle.

As a result of the utilization of the power supply shown and described, the output filter current produced in the low voltage operation is relatively high peak-to-peak but is also very constant. On the other hand, the output filter current produced in the high voltage operation is of lesser amplitude peak-to-peak but of a different periodicity to establish a constancy in the value of the output signal.

Figure 4:
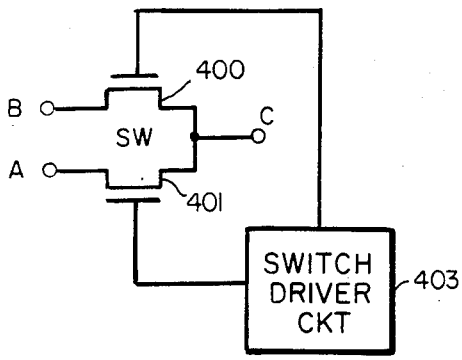
FIG. 4 is a schematic diagram of another embodiment of the switching apparatus for use with the instant invention.

Referring now to FIG. 4, there is shown a schematic diagram of one type of switching mechanism which can be used with the invention. This switching mechanism is, typically, a semiconductor device which includes field effect transistors 400 and 401 (FET) in lieu of a relay-type switch such as shown for switch SW1 or SW2 in FIG. 1. The switch is controlled by a suitable drive circuit 403 such as Silicon General SG1526, or the like. It is contemplated that, in high frequency operations, a semiconductor switch would be more practical than a relay-type switch. The switching circuit shown in FIG. 4, typically, includes an N-type device and a P-type device with a suitable switch driving circuitry connected thereto. This type of switching circuit is known in the prior art and does not form a portion of the invention, per se, other than to provide another embodiment of a switching mechanism. The details of this switch circuit are deemed unnecessary to be recited at length at this time.

Thus, there is shown and described a unique power supply circuit which is readily adapted to miniaturized topology and which meets low voltage and low ripple requirements. The power supply also reduces the bulky magnitude of the magnetic portions of the power supply circuit. Thus, it is more readily usable in many military applications. Also, with this system, the capacitor which is, typically, less than 10 microfarads, can be of a ceramic-type material rather than tantalum, or the like, in order to take advantage of the high density aspects thereof. Moreover, the military ratings requirements for ceramic capacitors can be met more easily. Also, this topology can provide a high power density, e.g. 100–200 watts/in$^3$ at high frequency.

While the present description is directed to a preferred embodiment, it is clear that modifications to the specific design and the individual components can be made by those skilled in the art without departing from the theme of the present invention. Any such modifications which fall within the purview of this description are intended to be included therein as well. The embodiment described herein is intended to be illustrative only and is not intended to be limitative. Rather, the scope of the invention is limited only by the claims appended hereto.

I claim:
1. A transformer circuit comprising,
   first electrical transformer means having a primary winding and a secondary winding,
   second electrical transformer means having a primary winding and a secondary winding,
   source means,
   capacitor means,
   switch means for selectively connecting at least one of said primary windings to said capacitor means to receive an electrical signal therefrom and selectively connecting each of said primary windings to said source means when said primary winding is not connected to said capacitor means, and
   output means connected to both of said secondary windings of said first and second electrical transformer means.
2. The circuit recited in claim 1 wherein,
   said output means includes unilaterally conducting means to control the direction of the output signal.
3. The circuit recited in claim 1 wherein,
   said switch means comprises,
   a first switch which selectively connects said primary winding of said first transformer means to said capacitor means or to said source means, and
   a second switch which selectively connects said primary winding of said second transformer means to said capacitor means or to said source means.
4. The circuit recited in claim 1 wherein, said secondary windings of said first and second transformer means are connected to a common load means.

5. The circuit recited in claim 1 wherein, said switch means comprises semiconductor devices.

6. The circuit recited in claim 1 wherein, said capacitor means comprises a ceramic capacitor.

7. The circuit recited in claim 2 wherein, said unilaterally conducting means comprises diodes.

8. The circuit recited in claim 3 wherein, said first switch and said second switch selectively connect said capacitor means to said first transformer means and to said second transformer means concurrently.

9. The circuit recited in claim 1 wherein, said switch means comprises a pair of field effect transistors connected in parallel, and drive circuit means connected to said pair of field effect transistors to cause said field effect transistors to operate alternatively.

10. The circuit recited in claim 9 wherein, said pair of field effect transistors are of opposite conductivity types.

11. The circuit recited in claim 1 wherein, said capacitor means is continually charging and discharging through said switch means and the respective primary windings of said first and second electrical transformer means in order to provide energy to said output means through the inductive coupling to the respective secondary windings of said first and second electrical transformer means.

12. The circuit recited in claim 1 wherein, said source means provides a DC voltage and said circuit operates as a DC/DC converter.

13. The circuit recited in claim 1 wherein, said switch means comprises relays type switches.

* * * * *